Feb. 21, 1961     W. B. GRAY     2,972,499
PNEUMATIC CONVEYOR SYSTEM FOR TRANSPORTATION
OF BULK MATERIAL
Filed Aug. 8, 1958     2 Sheets-Sheet 2
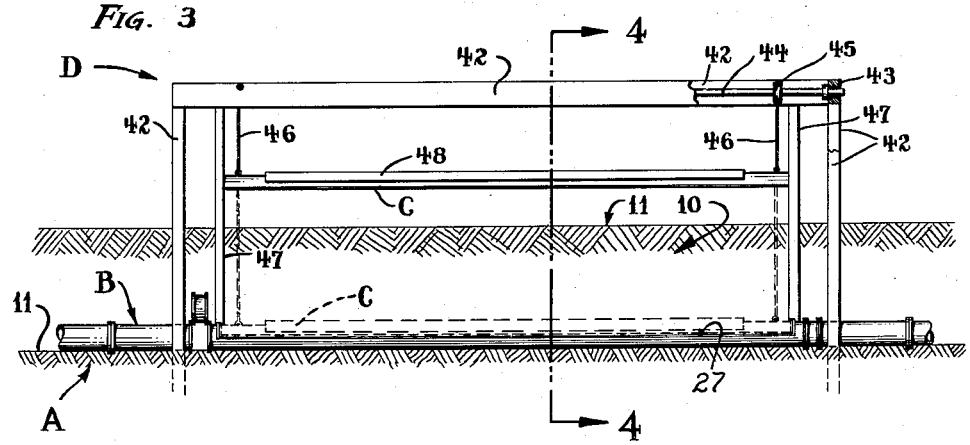
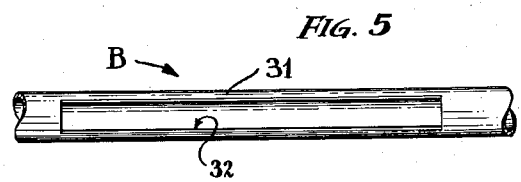
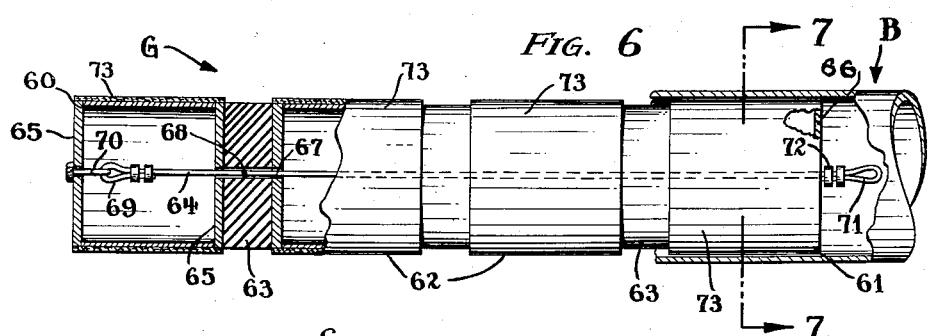
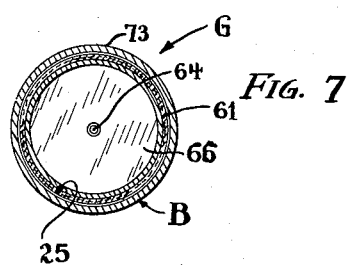
INVENTOR
WILLIAM B. GRAY
BY Rommel, Allexis & Rommel
ATTORNEYS United States Patent Office 2,972,499
Patented Feb. 21, 1961

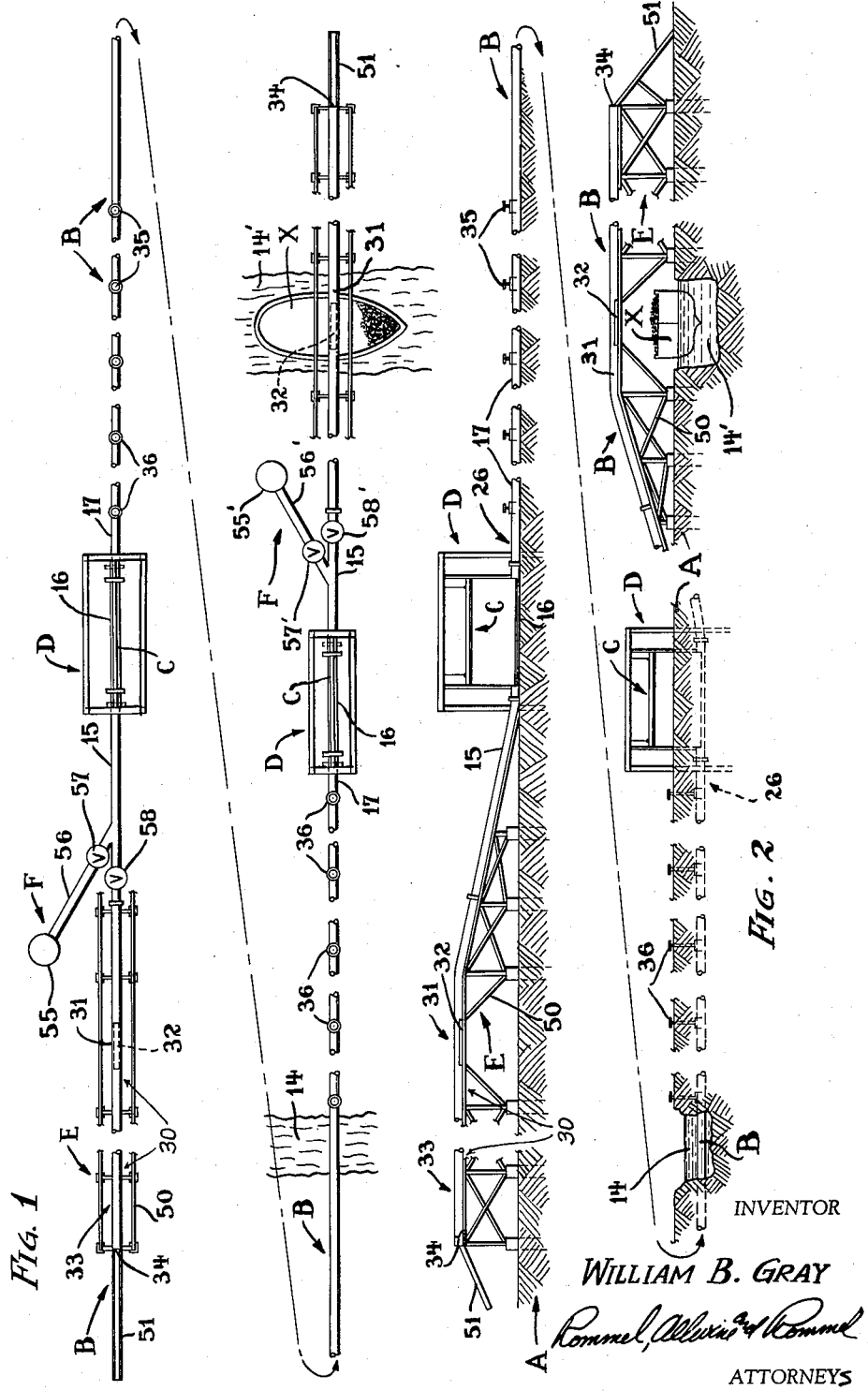

2,972,499
PNEUMATIC CONVEYOR SYSTEM FOR TRANSPORTATION OF BULK MATERIAL

William B. Gray, 312 Webster Ave., Brooklyn 30, N.Y.

Filed Aug. 8, 1958, Ser. No. 754,047

7 Claims. (Cl. 302—17)

This invention relates to pneumatic conveyor systems and pneumatic conveyor methods, but more particularly to pneumatic conveyor systems and methods for the transporting of bulk material. By way of example, the material may be mined coal, mined iron or other ores, or metallic billets.

An important object of the invention is to provide a pneumatic conveyor system for the transporting of bulk material, not enclosed in carriers, such as those employed in pneumatic dispatch systems, through conduits to destinations which may be miles distant from the loading or departure point.

Another important object is to provide a pneumatic conveyor system for the transportation of bulk material through conduits so constructed and arranged that the material may be introduced to a conduit at a loading point below the ground surface and discharged at a point above the ground surface. Such loading point may have a passageway for the material from the ground surface to the conduit, so that the material may be dumped at the ground surface, and discharged, by gravity, at the discharge point.

A further important object is to provide a system as described above, in which the material is introduced directly into a conduit through an opening or slot therein and the slot then covered by a closure, against the escape of air and material through the opening or slot, prior to transportation of the material through the conduit. For purposes of economy, the closure may be a portion separated from the conduit to provide a material receiving mouth.

Furthermore, an important object is to include pusher means behind the introduced material but not under or in front of the latter and which will permit automatic discharge of the material at the destination without discharge of the pusher means at the discharge point or destination of the material, the pusher means travelling to a pusher means discharge point after the discharge of the material.

Still another important object is to provide flexible and partly resilient articulated pusher means which permits the same to travel along curvatures in a conduit and will minimize damage to the pusher means.

Additionally, an important object is to provide a pneumatic conveyor system for bulk material over long distances, which system does not contemplate the employment of expensive or complicated transporting machinery but, instead, relatively simple and comparatively inexpensive structures.

A further important object is to provide steps in the method of rapidly handling bulk material, such as stated, by way of example, and a pusher means or body, temporarily associated with the material, for the pneumatic transportation of the material and pusher means or body over long distances, such as over a mile, without the use of material elevating or lowering machinery and protecting the material, during transportation, against the elements.

Other objects and advantages of the invention will be apparent during the course of the following detailed description of the invention, taken in connection with the accompanying drawings, forming portions of this disclosure and in which drawings:

Figure 1 is a schematic top plan of the system, broken in several parts because of the proportional length of the system.

Figure 2 is a schematic side elevation also broken in several parts because of the proportional length of the system.

Figure 3 is a view partly in side elevation of an elevator means and of a conduit with closure therefor of the system, and partly in vertical section of a sub-surface zone.

Figure 4 is a vertical sectional view, substantially on the line 4—4 of Figure 3.

Figure 5 is a fragmentary plan of a material discharge portion of the system.

Figure 6 is an enlarged view, partly in side elevation and partly in vertical section, of material pusher means of the system, disposed in a conduit.

Figure 7 is a vertical section substantially on the line 7—7 of Figure 6.

In the drawings, wherein for the purpose of illustration is shown a preferred embodiment of the invention and wherein similar reference characters designate corresponding parts through the several views, the letter A designates a portion of the earth; B, a conduit; C, a closure therefor; D, elevator means for selectively raising and lowering said closure and retaining it in a raised position; E, support means for supporting a portion of the conduit B above a surface as that of the portion A; F, pneumatic pressure fluid supply means for the movement of the material and pusher means G through the conduit B.

The system is adapted to be disposed on, above or in a portion A of the earth, or partly above, partly in or partly on this portion. The portion may be earthy and/or rocky and the portion may also include a body or bodies of water about the intermediate portion of the conduit B, since the system is adapted to transport material, through a conduit, extending through, below or above bodies of water as well as land.

In the example shown, the portion A may be provided with a suitable number of downwardly-extending passageways, one being shown, by way of example, in Figure 4 at 10, extending from the upper surface 11 of the portion A, preferably with downwardly-converging sides 12 to a material receiving mouth 27 of the conduit B to be subsequently described. If desired, the sides may be faced, substantially as at 13, with any suitable material as concrete, stone or metal, but this is not always necessary particularly where the portion, at the walls of the passageway, is of hard material, as rock. In the example shown in Figures 1 and 2, the conduit B is shown to extend below the surface of a body 14 of water and one of the support means E, supporting a part of the conduit B, may extend over a body 14' of water forming a part of the portion A.

The conduit B is shown, by way of example, as a continuous, elongated one, either straight or having longitudinally curved portions, and which may be of steel, comprise a plurality of sections, as the sections 15, 16 and 17, suitably joined together in any approved way as by conventional welding or the use of conventional flanged ends and nuts and bolts, by way of example, to provide a substantially fluid-tight conduit. I prefer that the conduit wall be substantially circular in transverse section, as may be seen in Figure 7, with a preferably substantially smooth inner face 25. At the material loading portion 26 of the conduit, I provide a material receiving mouth 27. Preferably the mouth is an elongated slot in the conduit wall, extending longitudinally of the conduit. The mouth 27 is of a size to receive the material to be transported or conveyed, which material may be large lumps of so-called steamboat anthracite coal, elongated metallic billets, as well as material of lesser bulk. An example of the size of the mouth 27 may be, for a conduit of 12" interior diameter, a width of mouth substantially 12" and length of substantially 20'.

By way of example, there are shown two discharge portions 30 at either end of the system and comprise conduit sections 31 defining material discharge portions, and each being provided with a downwardly opening discharge mouth 32, shown particularly in Figure 5, which mouth is preferably an elongated slot in the section 31. This slot may be as long but is necessarily not quite as wide as the interior diameter of the conduit section 31, for a reason later detailed. For example, the width of the mouth 32 may be an inch or two less than the interior diameter of the section 31, but the width of the mouth 27 may be substantially equal to the interior diameter of the conduit section containing it. Material entering the sections 31 will drop by gravity through the mouths 32.

Each of the discharge portions 30 also includes conduit sections 33 defining a pusher means discharge portion for the discharge of pusher means G to be subsequently described. The endmost conduit section 33 has an open end mouth 34 from which the pusher means are ejected.

The material transporting portion 35 of the conduit B is disposed, in the example shown, next to the two material loading portions 26, with the latter between the portion 35 and the discharge portions 30, but in the event there is but one material loading portion 26 and one discharge portion 30, then the material transporting portion 35 would be between these two portions 26 and 30.

For the purpose of controlling flow through the conduit B, I provide a plurality of spaced-apart valves, such as conventional pressure release valves 36 and interposed in the conduit sections 31.

Lateral conduit sections 56 are shown opening into the main conduit between the ends of the later and the material loading portions 26 and are parts of the pneumatic pressure fluid supply means F to be later described. By removing a portion of a cylindrical conduit wall to provide the mouth 27, a closure C is provided, by the removed portion. Thus, there is provided a semi-circular closure.

Of course the mouth 27 opens upwardly and substantially aligns with the lower mouth of the passageway 10, whereby bulk material deposited in the passageway will drop through the mouth 27 into the conduit and the closure C may be raised or lowered through the passageway.

I have discovered that it is not satisfactory to provide a hinged closure. Bulk material has a way of lodging on the edge portion of a mouth, like the mouth 27, containing the hinge and jams the hinged closure when it is lowered, frequently breaking the hinge. Moreover, such hinged closures are in the way when depositing bulk material into a mouth disposed below a surface 11.

Elevator means D to selectively raise or lower the closure from or to close the mouth and to retain the closure suspended above the mouth and passageway may be any approved means for the purpose. For example, in Figures 3 and 4 there are shown a support structure 40 including corner uprights 41, of similar construction, connected at their upper end portions by horizontal side cross members 42 and horizontal end cross members 43 with a horizontally-disposed shaft 44, journalled in the end members and rotatably supporting a pair of pulleys or sheaves 45, secured thereto and with suitable cables 46 trained thereover with an end of each secured to the upper portion of the closure C as by eyed members extending from the closure C. The cables 46 may extend to conventional winches (not shown) for manually winding up or paying out the cables. In order to guide the closures in their up and down movement, I may employ guideways 47 for sliding contact of the corner portions of the closure. It will be seen, as in Figure 4, that it is preferred that the closure may be raised considerably above the horizontal plane of the upper surface 11 so that material to be transported may be readily introduced into the passageway 10 and from thence fall through the mouth 20 into the conduit. The weight of the closure C may be augmented by a weighted member 48 disposed upon the upper surface of the closure and which may be conventionally welded thereto. The closure will then remain in a closed position despite pressure exerted against it by the pressure fluid within the conduit.

In some cases, it will be desirable to position the material receiving mouth 27 at or slightly above the ground surface. For example, the conduit B may have one or more portions disposed upon the portion A, or with this or these conduit portions partly below the surface of the portion A so that the mouth 27 and the surface of the portion A will be in the same horizontal plane. In any case, a closure C and elevator means D for the closure will be provided.

The means E to support the discharge portions 30 preferably above the general surface 11 (so that material discharged from the mouths 32 may descend by gravity into trucks or barges, for example, positioned like the barge X below the mouth 32) preferably comprises suitable trestles 50 to which the conduit B ascends gradually and then levels off, such as shown in Figure 2. These are of conventional construction other than that each has means to receive the pusher means G to be described as this means is discharged from the mouths 34. This means may be a slideway 51 from the top of the trestle to the surface 11.

The pneumatic fluid pressure supply means F may be suitable fluid-tight reservoirs 55 and 55' for fluid (as air) under pressure with conduits 56 and 56' therefrom opening into the conduit B at suitable locations which are preferably at the material loading portions 26, with the conduit sections containing the mouths 27 being between the material transporting portion 35 and the means G when the latter is in an operative position behind the material to be pushed, as will be described below. In addition to the valves mentioned, there may be a conventional gate valve 57 and 57' interposed in the conduits 56 preferably closely adjacent the point the conduits 56 open into the conduit B and gate valves 58' interposed in the conduit closely adjacent the valves 57 and 57' respectively.

Since the material transported is bulk material with minute to relatively large interstices between the bodies making up the material, pusher means G which is substantially air-impervious is provided for effective operation of the system. Such means is shown in Figures 6 and 7, and comprises a pusher assembly made up of a plurality (as four) of cylindrical pusher bodies comprising a forward pusher body 60, rearward pusher body 61 and a suitable number of intermediate pusher bodies 62 with resilient means as rubber disc bodies 63 between the bodies 60 and 62 and 61 and 62, and all flexibly secured together, as by a cable 64. The bodies 60, 61 and 62 may be hollow, with tubular side walls and disc-like end walls 65 and 66, each of the end walls being provided with an axial opening 67, and each of the rubber disc bodies 63 also being provided with axial openings 68 normally aligning with the openings 67. Preferably, the front end wall 65 of the forward pusher body 60 and the rear end wall 66 of the rearward pusher body 61 are removable so that access may be had to the interior of the most forward body 60 in order to secure thereto one end of the cable 64 which may be provided with an eye 69 after the end is threaded through the opening 66 in the rear end wall 66, of the pusher body 60, and this eye secured to the hook of preferably a flat-headed eye-bolt 70 extending inwardly from the end wall 65. Outwardly of the end wall 66 of the pusher body 61 the cable may have a becket eye 71 or the like for attaching a cable (not shown) thereto for moving the means G as by a crane or the like. The becket eye may include a conventional clamp 72 in abutment with the outer face of the end wall 66 of the body 61. I prefer to provide antifriction means 73 about the outer peripheries of the bodies 60, 61 and 62. Such means may be, for example, cylinders of rubber and fabric, well surfaced and impregnated with lubricants, since rubber bearings are desirable where particles like metallic particles, grit and other abrasives might be encountered. The use of the flexible cable 64 and the resilient means, as the discs 63, permits the pusher means G to flex or curve longitudinally as when it is projected through a longitudinally curved portion of the conduit B.

In the system as illustrated, with fluid pressure cut off from the conduit B as by closing the gate valves 57 and 57' and gate valve 58' also closed, but gate valve 58 open, one of the pusher means G is positioned in the conduit, as introduced through the passageway 10 and mouth 27 at the material loading portion 26 adjacent the extreme right hand parts of Figures 1 and 2 and moved to the right in these views so that its pusher body 60 clears the vertical plane of the mouth 27. Material is now introduced through the mouth into the conduit and both closures C lowered (if the distant one be not already closed) to close the mouths. With the relief valves 36 in operative condition, the gate valve 57' is opened and the pressure fluid (as air) when released will force the introduced pusher means G to contact the material and, in turn, force it forward until the material reaches the discharge mouth 32 at the extreme left in Figures 1 and 2, whereupon the material will drop therefrom but the pusher means G, because its diameter is greater than the width of the discharge mouth, will continue on and discharge from the mouth 34 and slide down the slideway 51 where it and other ejected pusher means may be collected and, at an opportune time, returned, after being introduced through the left-hand mouth 27 of Figures 1 and 2, the closures C closed, the valve 58 closed and the valve 58' opened. The pusher means will finally eject from the opposite mouth 32 and may be collected and re-introduced, one after another, back of a charge of material. Of course, if it is desired to introduce material into the conduit through the mouth 27 at the left-hand parts of Figures 1 and 2, the procedure will be, as is now believed apparent, so that the material will discharge from the mouth 32 at the extreme right-hand part of Figures 1 and 2.

While the pressure relief valves can be so adjusted, as is well understood, so that all of the material will have an opportunity to drop from the discharge mouth ahead of the pusher means G, the pressure must be sufficient to keep the pusher means moving until it is discharged from the end mouth 34. In this respect, the discharge mouths 32 act in part as relief valves, so that the pusher means will not overshoot the slideways 51. Because the pressure means is resilient, any shock to which it is subjected upon reaching the bottom of the slideway is taken up without damage to the pusher means. The resilient means 63 of the pusher means also cushions the latter as the pressured pusher bodies first contact a charge of inert bulk material in the conduit.

Various changes may be made to the form of the invention herein shown and described, without departing from the spirit of the invention or scope of the claims.

What is claimed is:

1. In a pneumatic conveyor system for transportation of bulk material, a conduit arcuate in transverse section having a material loading portion, a material discharge portion and a material transporting portion intermediate the material receiving and discharge portions, said conduit, at said material loading portion, having a material receiving mouth having upwardly facing longitudinal edges, a closure, arcuate in transverse section, for said mouth and having downwardly facing longitudinal edges for disposition upon said upwardly facing edges, and elevator means for selectively raising said closure from said mouth and for selectively lowering said closure to close said mouth and for releasably retaining said closure, in a substantially horizontal position, raised above the vertical plane of said mouth, whereby material may be introduced into said mouth through the space between the raised closure and said mouth, pneumatic means to cause said material to move through said conduit toward and to said material discharge portion including a pressure fluid under pressure, and air-impervious pusher means within said conduit interposed between said material and said pressure fluid under pressure.

2. In a pneumatic conveyor system for transportation of bulk material, a conduit, circular in transverse section, having a material loading portion, a material discharge portion and a material transporting portion intermediate the material receiving and discharge portions, said conduit, at said material loading portion, having a material receiving mouth with upwardly facing elongated parallel edges, a closure, semi-circular in transverse section, for said mouth and having downwardly facing elongated parallel edges for disposition upon said upwardly facing edges, elongated cylindrical pusher elements for sliding through said conduit, and elevator means for selectively raising said closure in a substantially vertical path from said mouth and for selectively lowering said closure in a substantially vertical path to close said mouth and for releasably retaining said closure, in a substantially horizontal position, raised above the vertical plane of said mouth, whereby material and said pusher elements may be introduced into said mouth through the space between the raised closure and said mouth, and pneumatic means to cause said material to move through said conduit toward and to said material discharge portion.

3. In a pneumatic conveyor system for transportation of bulk material, the combination with a generally horizontally-disposed layer of earthly material having a downwardly-converging passageway therethrough, of a conduit having a material loading portion, a material discharge portion and a material transporting portion intermediate the material receiving and discharge portions, said conduit, at said material loading portion, having a material receiving elongated mouth disposed at and opening into the lower end of said passageway, an elongated closure for said mouth, elongated pusher means for sliding through said conduit, and elevator means for selectively raising said closure in a substantially vertical path from said mouth and for selectively lowering said closure in a substantially vertical path to close said mouth and for releasably retaining said closure, in a substantially horizontal position, raised above the horizontal planes of said mouth and passageway, whereby material and said pusher means may be introduced into said mouth through said passageway and the space between the riased closure and said mouth, and pneumatic means to cause said material to move through said conduit toward and to said material discharge portion.

4. A pneumatic conveyor system for transportation of bulk material, including an elongated conduit having a material loading portion adjacent one end thereof, a material discharge portion adjacent the other end thereof, a pusher means discharge portion at said other end, and a material transporting portion intermediate the material receiving and discharge portions, said conduit, at said material loading portion, having a material receiving mouth, a closure for said mouth and elevator means for said closure, substantially air impervious pusher means for introduction to said conduit through said mouth back of bulk material introduced into said conduit at said mouth, said material discharge portion having a downwardly-opening material discharge mouth, formed by an elongated slot in said conduit, and pneumatic means to cause the introduced bulk material and said pusher means to move through said conduit toward and to said material discharge mouth for the discharge of said introduced bulk material at said downwardly opening discharge mouth and the discharge of said pusher means at said pusher means discharge mouth.

5. A pneumatic conveyor system according to claim 4 characterized in that the said pusher means is an elongated pusher assembly having a general width greater than the width of said discharge mouth, whereby said pusher body will not discharge at said material discharge mouth.

6. A pneumatic conveyor system according to claim 5 characterized in that said pusher means discharge mouth is defined by the open end of said conduit.

7. A pneumatic conveyor system according to claim 5 characterized in that said pusher assembly is articulated and comprises a plurality of rigid pusher bodies, a resilient disc body between each two pusher bodies and a flexible cable connecting said bodies in side face to side face relationship.

References Cited in the file of this patent

UNITED STATES PATENTS

| | | |
|---|---|---|
| 2,258,174 | Chawner | Oct. 7, 1941 |
| 2,539,109 | Webb | Jan. 23, 1951 |
| 2,573,907 | Humphreys | Nov. 6, 1951 |
| 2,736,611 | Wesh | Feb. 28, 1956 |